March 1, 1955 L. W. BOERNER ET AL 2,703,146
FIRE EXTINGUISHING FOAM CHAMBER
Filed Sept. 7, 1951 4 Sheets-Sheet 1

INVENTORS
LEWIS W. BOERNER
EDWARD C. HOLMES
BY HARRY BRUCE MURRAY

ATTORNEY.

INVENTORS
LEWIS W. BOERNER
EDWARD C. HOLMES
HARRY BRUCE MURRAY
ATTORNEY.

March 1, 1955 L. W. BOERNER ET AL 2,703,146
FIRE EXTINGUISHING FOAM CHAMBER
Filed Sept. 7, 1951 4 Sheets-Sheet 4
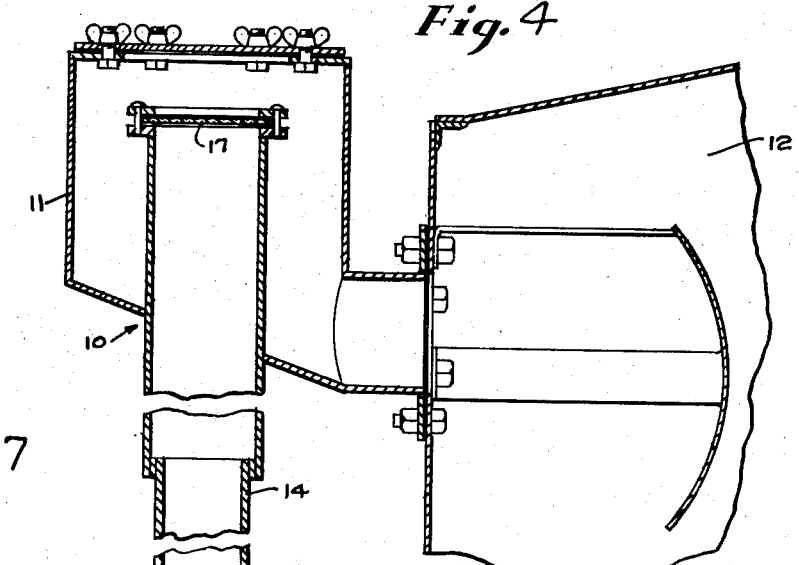
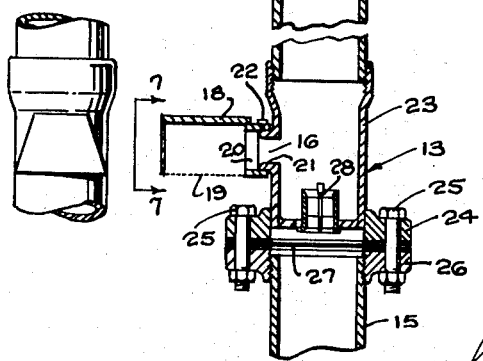
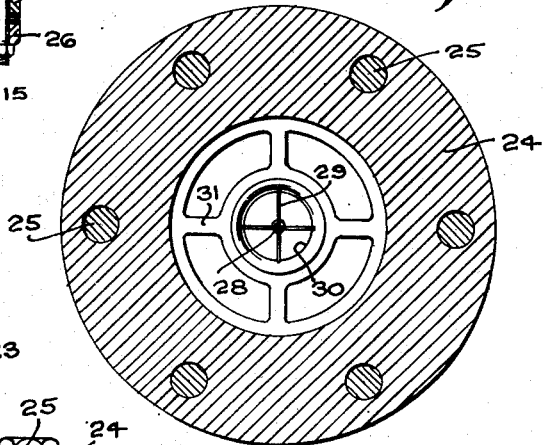
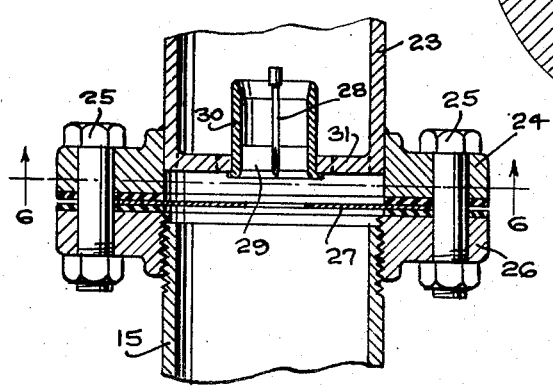
INVENTORS
LEWIS W. BOERNER
EDWARD C. HOLMES
BY HARRY BRUCE MURRAY
*ATTORNEY.*

United States Patent Office 2,703,146
Patented Mar. 1, 1955

2,703,146

FIRE EXTINGUISHING FOAM CHAMBER

Lewis W. Boerner and Edward C. Holmes, West Chester, and Harry Bruce Murray, Philadelphia, Pa., assignors to National Foam System, Inc., West Chester, Pa., a corporation of Delaware Application September 7, 1951, Serial No. 245,587

3 Claims. (Cl. 169—4)

This invention relates generally to the production of mechanical or air foam employed in the extinguishment of fires, and more particularly to certain improvements in the design and construction of apparatus for applying fire-extinguishing air foam to the surface of a flammable liquid such as oil or gasoline.

The employment of so-called foam chambers or applicators for the delivery of mechanical foam, for instance, to the interior of oil tanks and the like is well known in the art, an example of one such foam chamber being that which is shown and described in United States Letters Patent No. 2,524,421, of October 3, 1950. In order for any such foam chamber to serve effectively to protect the tank against the ravages of fire, it is necessary, of course, that the tank be equipped with a foam chamber or applicator which delivers an adequate supply of foam-forming solution capable of producing within a required minimum period of time sufficient foam to form a fire-smothering blanket thereof over the entire surface area of the flammable liquid in the tank.

The National Board of Fire Underwriters (New York city, New York) has promulgated certain minimum requirements, the essentials of which it has set forth in its pamphlet No. 11 for the year 1950 as follows:

(1) For the proper and safe protection of flammable liquid storage tanks the foam-forming solution must be applied at the rate of one gallon per minute (1 G. P. M.) for each ten square feet of surface area of the flammable liquid contained in the tank; and (2) All flammable liquid storage tanks must be equipped with one or more foam applicators capable of delivering 1 G. P. M. of foam-forming solution per ten square feet of tank area, the minimum number of applicators required for each tank being dependent upon its size as follows:

(a) For tanks not exceeding 65 feet in diameter—one (1) applicator.

(b) For tanks between 65 and 117.5 feet in diameter—two (2) applicators.

(c) For tanks between 117.5 and 140 feet in diameter—three (3) applicators.

(d) For tanks above 140 feet in diameter—four (4) applicators.

It will be understood that each applicator above referred to essentially includes, in addition to the foam chamber from whence the foam issues into the tank, a so-called "foam maker" from which the foam-forming solution is discharged at high velocity in the form of a finely subdivided stream capable of entraining air from atmosphere to form foam. Typical of this "foam-maker," sometimes referred to as a nozzle unit, is that shown in the above mentioned Patent No. 2,524,421, wherein it is designated by the reference numeral 25, it being noted that all such foam-makers or nozzle units employed prior to the present invention have been provided with discharge orifices of fixed size.

Inasmuch as the rate of flow of the foam-forming solution issuing from a discharge orifice of a given area can only be varied by changing the pressure of the solution measured at the discharge orifice, which change of pressure is not always conveniently possible due to inadequate pressure of the liquid at its source of supply, it has been the general practice in the art prior to the present invention to provide foam makers of different G. P. M. capacities, each having a discharge orifice of different predeterminedly fixed size to insure a desired rate of flow therefrom of the foam-forming solution at a predetermined orifice pressure.

Of course, for any given size of foam-maker having a predeterminedly established G. P. M. capacity when operated at a prescribed minimum orifice pressure, the rate of flow may be increased within limits by increasing the pressure of the liquid at its source of supply to thereby increase the orifice pressure, but this is not always possible and in certain cases may require the use of an auxiliary pump, which, of course, entails additional expense. Where it has not been possible for reasons of economy or otherwise, to increase the orifice pressure and so obtain an increased rate of flow of foam-forming solution from a foam-maker of given size for adequate protection of a storage tank as required by the National Board of Fire Underwriters, the only resort has been to install an applicator having a foam-maker of sufficiently greater size. However, it is frequently the case that when a next larger size of applicator is so installed and is operated even at its prescribed minimum orifice pressure, the rate of flow of the foam-forming solution from its foam-maker is greater than was actually required to meet the Underwriter's specifications. Inasmuch as the increased size of applicator means greater cost and involves use of correspondingly increased size of piping, also of increased cost, it will be evident that the expense of installing even a next larger size of applicator, which produces at minimum orifice pressure a greater-than-necessary rate of flow of the foam-forming solution, may be prohibitively high, especially where, as required by the Underwriter's regulations, a tank must be equipped with two or more foam applicators.

Having in mind the foregoing, it is among the objects of the present invention to provide a design and construction of foam maker having a variable orifice to thereby widen the range of protection afforded by a given size of foam-maker when operated at any conveniently available orifice pressure to insure the delivery of foam-forming solution at the Underwriter's prescribed rate of one gallon per minute (1 G. P. M.) for each ten square feet of surface area of the flammable liquid in the storage tank.

A still further object of the invention is to provide a foam-maker with means for readily changing the effective diameter of its discharge orifice to accord with the orifice pressure at which the foam-maker is to be operated for delivery of the foam-forming solution therefrom at the prescribed rate above mentioned.

Still another object of the present invention is to provide a line of applicators for the delivery of fire-extinguishing air foam to flammable liquid storage tanks, each of which is characterized by the provision of a foam-maker, the discharge orifice of which may be readily changed to deliver, at the most desirable and economically convenient orifice pressure, foam-forming solution at the prescribed minimum rate above mentioned.

Other objects and advantages of the present invention will appear more fully hereinafter, it being understood that the present invention consists substantially in the combination, construction, location and relative arrangement of parts, all as described in detail hereinafter, as shown in the accompanying drawings and as finally pointed out in the appended claims.

In the accompanying drawings, which are illustrative of the present invention:

Figure 4 is a sectional view showing a foam applicator of the present invention applied to a storage tank to be protected;

Figure 5 is an enlarged sectional view of the portion of the foam applicator inscribed within the dotted lines of Figure 4;

Figure 6 is a transverse sectional view as taken along the line 6—6 of Figure 5; and Figure 7 is a side elevational view of a portion of the applicator as viewed from the line 7—7 of Figure 4.

Figure 1:
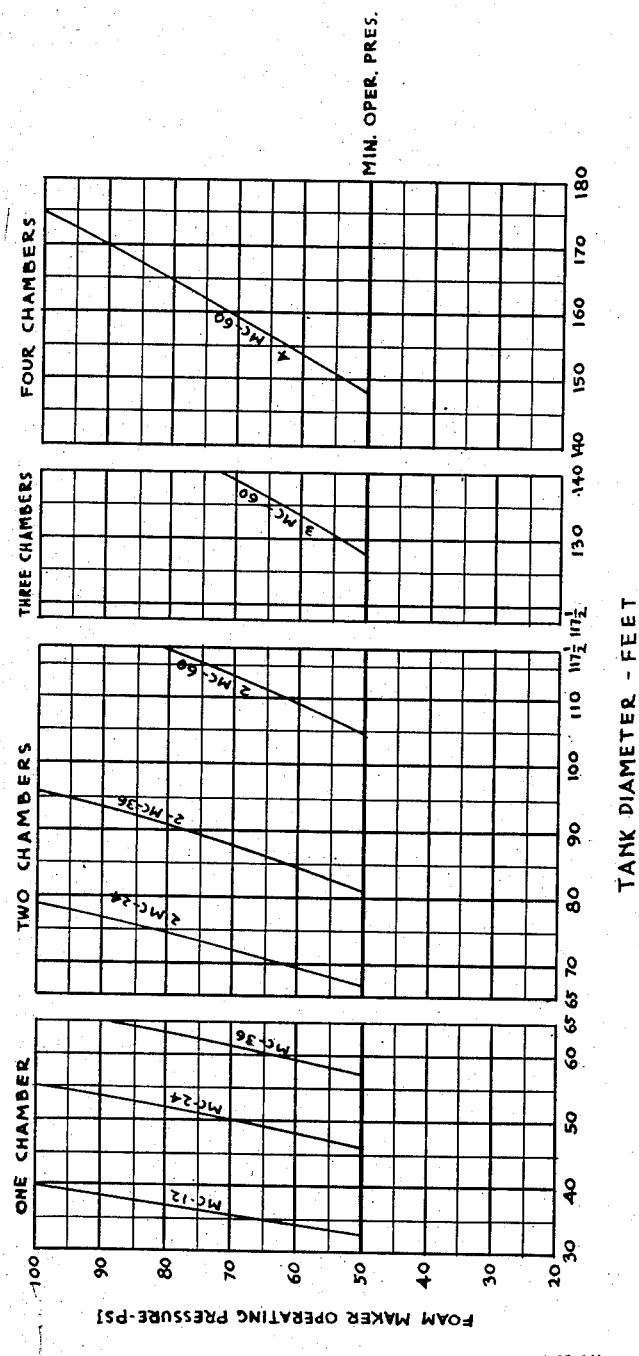
Figure 1 is a chart showing the scope of protection which is afforded by foam applicators of heretofore known construction when applied to flammable liquid storage tanks as required by the hereinbefore noted regulations of the National Board of Fire Underwriters.

In order to best obtain a proper appreciation of the principles of the present invention, reference is first made to the chart of Figure 1 which shows the application of the required foam applicators to storage tanks of different diameters, it being noted that the chart is divided into four sections which respectively relate to (a) tanks of diameters up to 65 feet requiring the use of at least one foam chamber or applicator; (b) tanks of diameters from 65 to 117.5 feet requiring the use of at least two foam chambers or applicators; (c) tanks of diameters from 117.5 to 140 feet requiring at least three chambers; and (d) tanks of diameters from 140 to 180 feet requiring at least four chambers.

It will be noted further that four different sizes of foam chambers or applicators are indicated in the chart of Figure 1, which are respectively designated MC–12, MC–24, MC–36 and MC–60, these being conventional chambers designed respectively to deliver 120, 240, 360 and 600 gallons of foam-forming solution per minute at an orifice pressure of 100 pounds per square inch, each such chamber being provided with a foam-maker or nozzle unit having a discharge orifice of predeterminedly fixed area.

Considering the first section of the chart of Figure 1, which relates to tanks up to only 65 feet in diameter, it will be observed that applicator MC–12 when operated at orifice pressures of from 50 to 100 pounds is only adequate to protect tanks ranging in diameter from 33 to 40 feet. The second larger applicator MC–24, when operated at the maximum orifice pressure of 100 pounds, affords protection for a tank not exceeding 55 feet in diameter, while the third largest applicator, MC–36, can be used to protect a 65 foot diameter tank only when it is operated at an orifice pressure of approximately 88 pounds. Thus, assuming that there was no available orifice pressure above 50 pounds, it would be necessary for adequate protection of a 65 foot tank, to use two of the MC–24 applicators or possibly one MC–60 applicator, which in either case would deliver more foam-solution in gallons per minute than is actually required. For example, for a 65 foot tank, the solution required to be applied in accordance with the Underwriter's regulations would be approximately 330 G. P. M. (1 G. P. M. per ten square feet), whereas, two MC–24 applicators would supply 340 G. P. M. at 50 pounds, while one MC–60 would supply 425 G. P. M. at 50 pounds. The MC–36, operating at 50 pounds orifice pressure, as the chart of Figure 1 shows, delivers the foam-forming solution at a G. P. M. rate inadequate for required protection of a 65 foot diameter tank.

Similar analysis of the three remaining sections of the chart of Figure 1 will reveal comparable inadequacies when the present types of fixed-orifice foam-makers are employed for the protection of tanks greater than 65 feet in diameter and which require the use of two or more applicators. Thus, considering the third section of the chart relating to tanks of from 117.5 to 140 feet diameter requiring at least three applicators, it will be noted that three MC–60 applicators may be used for protection of a 140 foot diameter tank only when they are operated at orifice pressures of approximately 72 pounds. When operated at the lower and more generally available orifice pressure of 50 pounds, three such applicators are adequate only for a tank not exceeding approximately 128 feet in diameter, and consequently, at such reduced pressure, it would be necessary to employ four of the MC–60 applicators with resultant greater G. P. M. delivery of foam-forming solution than is actually required.

Referring now to Figures 4 to 7, it will be observed that the foam applicator of the present invention, designated generally by the reference numeral 10, includes the usual foam chamber 11 from which the fire extinguishing foam is delivered into the interior of the flammable liquid storage tank 12 or to and upon whatever flammable surface is to be blanketed with the foam. The construction of this chamber may be of any desired form, as, for example, that shown in the above mentioned United States Patent No. 2,524,421.

In addition, the applicator essentially includes a foam-maker or nozzle unit, generally designated 13, which is disposed at any suitable point in the vertical conduit or stand-pipe 14 leading to the foam-chamber 11, the function of the foam-maker 13 being to finely sub-divide and discharge at high velocity into the conduit 14 the foam-forming solution which is delivered from any suitable source of pressure supply thereof to the foam-maker by way of the supply conduit 15. Operatively associated with the foam-maker or nozzle unit 13 is an air inlet orifice 16 in communication with the interior of the conduit 14, this orifice being of such shape and design, as more particularly described in the aforementioned United States Patent No. 2,524,421, as to initially permit the development in the conduit 14 of the necessary hydraulic pressure to rupture the diaphragm 17 of the foam chamber and thereafter permit the entrainment of air from atmosphere into the finely divided stream of the foam-forming solution to produce the foam as required. Preferably, the air inlet orifice 16 is protectively shielded against injury and the entry therein of foreign matter by an external housing member 18 the open bottom end of which is fitted with a screen 19, the protective housing being provided with a mounting neck 20 which snugly embraces the annular external flange 21 of the air inlet orifice and is removably secured thereto, as by a set screw 22.

The foam-maker or nozzle unit 13 includes as a part thereof the conduit section 23 in which is included the laterally presenting air inlet orifice 16, this conduit section being provided at its bottom end with an annular bolting flange 24 by means of which it is coupled, through bolts 25, to a complemental flange 26 threaded or otherwise secured to the supply conduit 15 for the foam-forming solution. Clamped between the bolting flanges 24—26 and extending transversely across the open end of the supply conduit 15 is a centrally apertured orifice plate 27, through which the stream of foam-forming solution is discharged with sufficient velocity and pressure to insure, upon subsequent sub-division of the stream and entrainment of air therein to form foam, sufficient carry of the foam to the area of its application. Any suitable means may be employed to sub-divide the stream of solution issuing from the orifice plate 27 for maximum entrainment of air therein, a preferred means being that shown in Figures 4 to 6 and which essentially includes a headed pin 28 extending axially of the stream of solution issuing from the nozzle plate. This pin 28, which is located closely adjacent the upstream side of the orifice plate, is suitably supported by radially extending arms 29 centrally in a cylindrical sleeve 30, which in turn is supported within a centrally apertured spider 31 preferably but not necessarily formed as an integral part of the lower end of the conduit section 23. The foam-forming solution which issues from the orifice plate 27 passes at relatively high velocity through the bore of the sleeve 30 into the conduit section 23, in which latter section it is disrupted and more or less finely subdivided by the headed pin 29 for ensuing entrainment of atmospheric air by way of the air inlet orifice 16 to form mechanical foam, as well understood in the art.

The orifice plate 27 is interchangeable with other such plates having central apertures of different diameter. Thus, for any given size of a foam applicator, any one of several orifice plates, each having one or more apertures of different total area, may be selectively clamped in position as shown to provide for the passage of foam-forming solution therethrough at the prescribed rate, e. g., 1 G. P. M. for each ten square feet of surface area to be protectively blanketed with foam, the size of the orifice in the plate 27 being dependent upon the pressure of the solution employed at the orifice plate for operation of the foam applicator.

By constructing the foam applicators as just described, i. e., with foam-makers or nozzles each adapted to be interchangeably fitted with any one of several orifice plates having discharge orifices of different effective area, the range of fire protection afforded by any one foam applicator is measurably increased. Further, by proper selective use of an orifice plate of the correct orifice area to accord it with the pressure of the foam-forming solution which is most conveniently and economically usable at the orifice plate, there is assured the delivery of foam-forming solution at the prescribed rate, thereby, in the first instance, avoiding delivery of a surplusage of solutions as when conditions call for use of a particular unit larger than one which is incapable of delivering the solution at the prescribed rate, except possibly, at an orifice pressure higher than that which is available, and, in the second instance, making possible operation of a foam applicator at an orifice pressure lower than that which would normally be required for an applicator of comparable capacity but with a discharge orifice of predeterminedly fixed and nonvariable size.

In carrying out the principles of the present invention, a series of foam applicators would be provided, each designed for delivery of foam-forming solution at a different minimum G. P. M. rate when operated at an orifice pressure of approximately 30 pounds, the number of different applicators in the series being the irreducible minimum required for protection of tanks ranging from below 65 foot diameter to above 140 foot diameter. Further, each applicator in the series would be adapted to be fitted with that one of the several interchangeable orifice plates as hereinbefore described which would be selectively employed as conditions would require for delivery of the solution at the prescribed rate.

Figure 2:
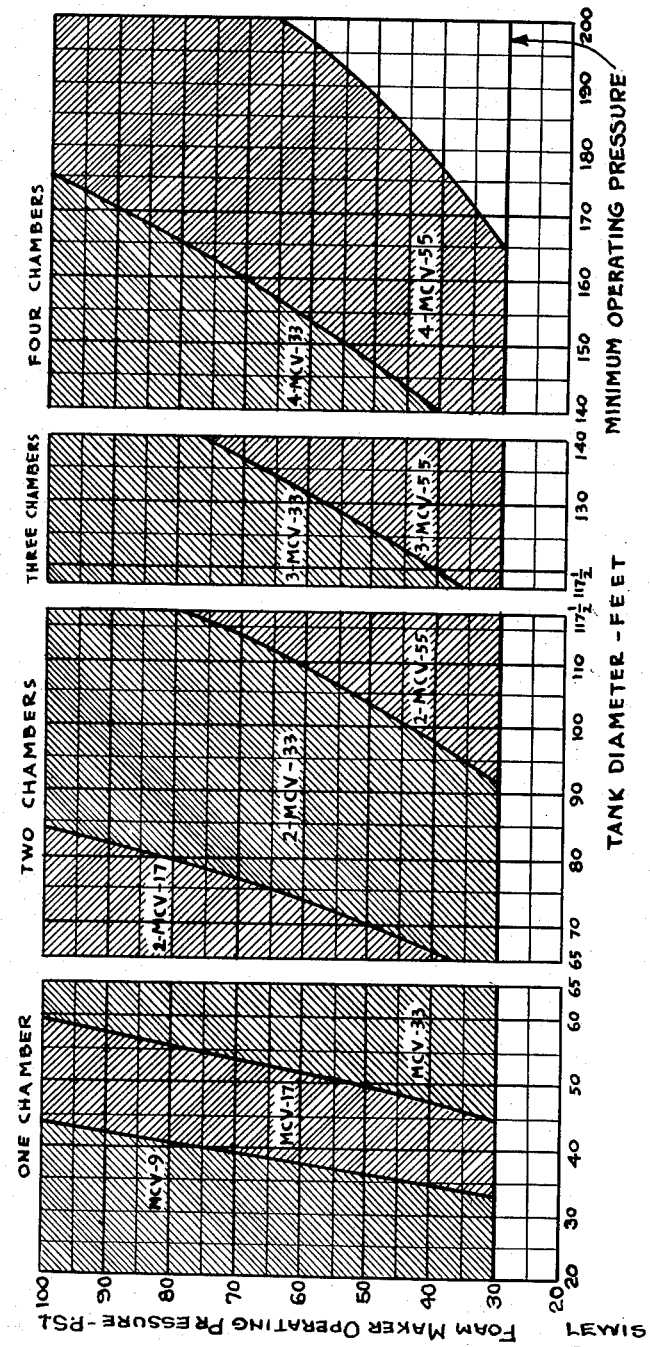
Figure 2 is a chart corresponding to that of Figure 1 but showing the scope of protection which is afforded by foam applicators having foam-makers or nozzle units constructed in accordance with the present invention.
Figure 3:
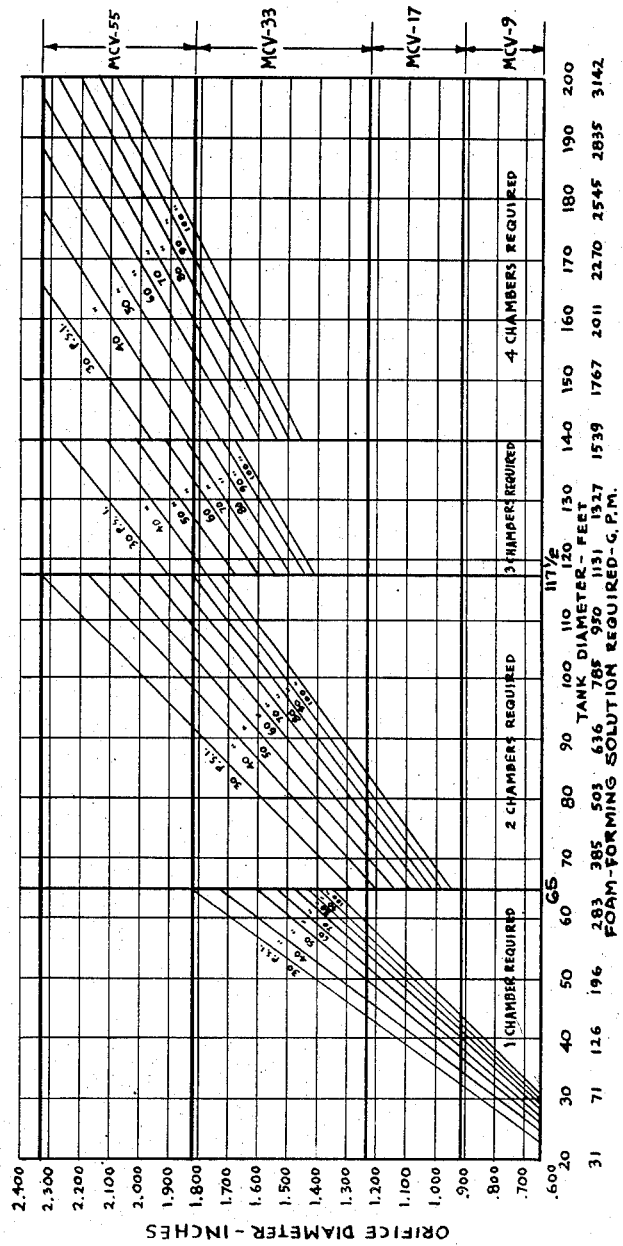
Figure 3 is a chart which graphically illustrates the variable range of protection obtained by changing the size of the discharge orifice of a given foam-maker accordingly as the pressure of the foam-forming solution at the discharge orifice is varied to insure the prescribed rate of flow of the solution for adequate protection of a storage tank of any given diameter.

The charts of Figures 2 and 3 illustrate the use of a series of such applicators respectively designated MCV-9, MCV-17, MCV-33 and MCV-55 and respectively designed to deliver at 30 pounds orifice pressure foam-forming solution at the maximum rates of 90, 170, 330 and 550 gallons per minute. Thus, from the chart of Figure 2, it will be observed that a single MCV-9 applicator may be employed to protect tanks up to approximately 33 foot diameter when operated at 30 pounds orifice pressure. At 30 pounds operating pressure, the next larger applicator (MCV-17) adequately protects tanks up to 45 foot diameter, while the third larger size applicator (MCV-33), when operated at only 30 pounds pressure, is adequate for a tank up to 65 foot diameter.

The graphs of Figure 3 have been plotted to show the requisite orifice diameters of the plates 27 which may be interchangeably fitted in each of several different sizes of applicators, respectively designated MCV-9, MCV-17, MCV-33 and MCV-55, in relation to the orifice pressures at which the applicators may be operated for delivery of foam-forming solution at the prescribed rate. For example, a 30 foot diameter tank having an area of approximately 710 square feet requiring 71 G. P. M. of solution, could be supplied with the solution by a single MCV-9 applicator when provided with a discharge orifice having an effective total area equal to that of a single opening 0.85 inch diameter for operation at 30 pounds orifice pressure. Should the tank be of, say, 33 foot diameter, with an area of approximately 860 square feet calling for 86 G. P. M. of solution, then the foam-maker would be fitted with an orifice plate having a discharge opening or openings of a total effective area equal to that of a single opening of approximately 0.920 inch in diameter.

In the case of a 90 foot diameter tank requiring the use of two applicators for application of 636 G. P. M. of foam-forming solution, two of the MCV-33 units would be employed each provided with a discharge orifice equivalent to an opening of 1,790 inch diameter for operation at 30 pounds pressure, while for operation at the same low pressure a 100 foot diameter tank, requiring 785 G. P. M. of solution, would use two of the MCV-55 units each fitted with a discharge orifice equivalent to a 1.980 inch diameter opening.

For a tank of say 130 foot diameter requiring the use of three applicators for application of 1327 G. P. M. of solution, for an operating pressure of 30 pounds, three of the MCV-55 units would be used each provided with a discharge orifice equivalent to 2.100 inches diameter, while for the same operating pressure, a 140 foot diameter tank, requiring 1539 G. P. M. of solution, could be protected by four MCV-55 units each fitted with an effective orifice opening of 1.970 inches diameter.

Thus, it will be apparent that by fitting a given unit with the proper size of discharge orifice as determined from the graphs of Figure 3, it may be operated at any conveniently available orifice pressure to deliver solution at the prescribed rate to the surfaces to be protected. While in the preceding examples, the units were selected for operation at the minimum orifice pressure of 30 pounds, where higher operating pressures are available, then the orifice diameters would be correspondingly changed for the given unit to deliver solution therefrom at the prescribed rate for the surface area to be protected. For example, for the above-mentioned 30 foot diameter tank, a single MCV-9 applicator, operating at an orifice pressure of 50 pounds would be fitted with discharge orifice of 0.750 inch diameter, and with a discharge orifice of 0.642 inch diameter for operation at 90 pounds pressure.

Also, where a higher operating pressure is available, it is possible in certain instances to employ smaller units with larger discharge orifices. Thus, in the case of the above-mentioned 130 foot diameter tank requiring the use of three MCV-55 units each having orifice diameters of 2.100 inches when operated at 30 pounds pressure, at a higher operating pressure of, say, 90 pounds, three of the next smaller MCV-33 units could be used, when each is fitted with a discharge orifice equivalent to a single opening of 1.600 inches diameter.

As a further example, assuming that protection was required for a tank of, say, 45 foot diameter and assuming that the available pressure at the discharge orifice of the foam-maker or nozzle unit was only 50 pounds, by reference to the graphs of Figure 3, it will be observed that there would be employed an MCV-17 applicator fitted with an orifice plate having a discharge opening of 1.100 inches diameter to insure the delivery of foam-forming solution at the prescribed minimum rate, e. g., 1 G. P. M. per 10 square feet of the tank area. Should the available orifice pressure be as high as 100 pounds, then there may be employed a single MCV-9 applicator fitted with an orifice plate having a discharge opening of 0.950 inch diameter, while should the available orifice pressure be as low as only 30 pounds, it might be necessary to use an MCV-33 applicator fitted with an orifice plate having a discharge opening of 1.250 inches.

The same considerations apply to tanks of greater than 65 foot diameter requiring use of two or more applicators per tank as required by the Fire Underwriter's regulations above mentioned, it being only necessary to install the proper orifice plates in the particular applicators selected for operation at the available pressure to provide for their delivery of the foam-forming solution at the prescribed rate. Of course, it will be understood that the applicator or applicators selected for a particular installation will generally be of the smallest size capable of delivering the requisite supply of foam-forming solution at whatever operating pressure is available at the discharge orifice, the orifice plate fitted in each selected applicator being that which insures the delivery of the solution under said available operating pressure at the prescribed rate. It is, of course, always desirable for reasons of low installation cost and economy of operation, to operate the applicators at minimum pressure, namely, in the range of from 30 to 40 pounds, and wherever possible the applicator selected for a particular installation should be of the most practicable size capable, when provided with the correct size of discharge orifice, of delivering the foam-forming solution at the prescribed rate.

It will be understood that the present invention is not limited in its application only to the protection of oil and gasoline tanks, nor is it limited to the use of the variable orifice foam-makers or nozzle units for the delivery of foam-forming solution to so-called foam chambers. Neither is the present invention limited to the provision of a single opening through the orifice plate because, obviously, a plurality of openings in any given plate may be employed which in their aggregate provide the requisite discharge orifice area for supplying the foam-forming solution at the prescribed rate for a given orifice pressure. The principles of the present invention are applicable to all apparatus for producing air foam which include foam-makers or nozzle units capable of being fitted with means for varying the effective area of the discharge orifice, such as the selectively interchangeable orifice plates specifically shown and described in this application. It is accordingly intended to claim the invention broadly, as well as specifically, as indicated in the appended claims.

What is claimed as new and useful is:

1. In an apparatus for mechanically producing fire-extinguishing air foam for application to a surface to be protected, a conduit section having means therein operative to produce foam for discharge on to said surface, a second conduit section for delivering foam-forming solution to said foam producing means in an amount sufficient to produce foam in said first conduit section at the maximum output capacity of said foam-making means, a plurality of plates each having a central orifice, said orifices of different plates being of different sizes, means for removably securing a selected one of said plates in interposed position between said conduit sections with the central orifice of the selected plate affording a direct communication between said conduit sections, the actual output of said foam producing means for a given pressure of the solution being thereby selectively controlled by the plate selected for use in the apparatus, the foam-making means in said first conduit section including means operative to effectively finely subdivide said foam-forming solution when the latter in the form of a compact stream passes into said first conduit section through said orifice plate, and atmospheric air inlet means communicating with the interior of said first conduit section downstream from said solution subdividing means for entraining air from atmosphere into the finely subdivided stream of the foam-forming solution to produce the foam.

2. In an apparatus for mechanically producing fire-extinguishing air foam for application to a surface to be protected, a first conduit section adapted to produce foam and having a discharge end through which said foam is delivered for application to said surface to be protected, a second conduit section for conveying foam-forming solution from a suitable source of supply thereof to said first conduit section, said first and second conduit sections being of sufficient cross-sectional area throughout to provide for the delivery of foam-forming solution from said second conduit section to said first conduit section in an amount sufficient to produce foam in the second conduit section at maximum output capacity of said apparatus, a plurality of plates each having a central orifice, said orifices of different plates being of different sizes, means for removably securing a selected one of said plates in interposed position between said conduit sections and extending transversely across the interior thereof, with the central orifice of the selected plate affording a direct connection between said conduit sections, the actual output of said apparatus for a given pressure of the solution being thereby selectively controlled by the plate selected for use in the apparatus, and means in said first conduit section disposed on the downstream side of the orifice plate selectively disposed between said conduit sections for finely subdividing the solid stream of foam-forming solution which passes through the central orifice of said selected plate, and air inlet means communicating with the interior of said first conduit section for entrainment of air from atmosphere into the finely subdivided stream of the foam-forming solution to produce foam in said first conduit section.

3. An apparatus for mechanically producing fire-extinguishing air foam as defined in claim 2 wherein said means for finely subdividing the stream of foam-forming solution passing through the selected orifice plate is disposed relatively close to said plate in axial alinement with the orifice thereof and wherein said atmospheric air inlet means is disposed in relatively close proximity to the region of emergence of the solution from the means for subdividing the same whereby air from atmosphere is entrained in the solution stream immediately upon subdivision thereof.

References Cited in the file of this patent

UNITED STATES PATENTS

| | | |
|---|---|---|
| 1,704,177 | Davenport | Mar. 5, 1929 |
| 2,524,421 | Boerner et al. | Oct. 3, 1950 |